(12) United States Patent
Siebenga

(10) Patent No.: US 6,997,663 B2
(45) Date of Patent: Feb. 14, 2006

(54) HAY BALE STACKER

(75) Inventor: Charles Siebenga, Manhattan, MT (US)

(73) Assignee: Pro Ag Designs (USA) Inc., Belgrade, MT (US)

( * ) Notice: Subject to any disclaimer, the term of this patent is extended or adjusted under 35 U.S.C. 154(b) by 426 days.

(21) Appl. No.: 10/040,589

(22) Filed: Jan. 4, 2002

(65) Prior Publication Data
US 2002/0090281 A1 Jul. 11, 2002

Related U.S. Application Data

(60) Provisional application No. 60/260,126, filed on Jan. 5, 2001.

(51) Int. Cl.
B60P 1/50 (2006.01)

(52) U.S. Cl. ............... 414/111; 414/489; 414/551; 414/555; 414/679; 414/789.7; 414/813

(58) Field of Classification Search ........... 414/24.5, 414/24.6, 111, 486, 489, 501, 551, 553, 555, 414/679, 789.7, 812, 813
See application file for complete search history.

(56) References Cited

U.S. PATENT DOCUMENTS

| 4,249,842 A | 2/1981 | Johnson ............ 414/24.5 |
| 4,268,202 A | 5/1981 | Verdenne et al. |
| 4,289,435 A | 9/1981 | Boirin et al. |
| 4,370,796 A | 2/1983 | Wilson ............ 29/564.3 |
| 4,431,357 A | 2/1984 | Butler ............ 414/24.5 |
| 4,630,986 A | 12/1986 | Taylor ............ 414/24.6 |
| 4,844,675 A | 7/1989 | Strosser et al. ............ 414/111 |
| 4,971,504 A | 11/1990 | Klompien ............ 414/111 |
| 5,025,992 A | 6/1991 | Niebur ............ 241/101.7 |
| 5,211,345 A | 5/1993 | Siebenga ............ 241/101.7 |
| 5,288,193 A | 2/1994 | Warburton et al. ............ 414/546 |
| 5,362,189 A | 11/1994 | Lindahl ............ 414/24.5 |
| 5,397,208 A | 3/1995 | Siebenga ............ 414/111 |
| 5,507,612 A | 4/1996 | Siebenga ............ 414/111 |
| 5,607,274 A | 3/1997 | Cook ............ 414/111 |
| 5,690,461 A | 11/1997 | Tilley ............ 414/111 |
| 5,697,758 A | 12/1997 | Tilley |
| 5,725,346 A | 3/1998 | Davina ............ 414/111 |
| 5,842,823 A | 12/1998 | Kohnen et al. ............ 414/111 |
| 6,019,562 A | 2/2000 | Cheatham ............ 414/111 |
| 6,048,160 A | 4/2000 | Reist et al. ............ 414/555 |

(Continued)

Primary Examiner—Janice L. Krizek
(74) Attorney, Agent, or Firm—Hovey Williams LLP

(57) ABSTRACT

Systems, methods and apparatuses for loading, unloading, and handling bales. A powered apparatus is configured to load bales, slide the bales from a loading mechanism to a rearward position on a platform, and unload the bales from the apparatus comprises a variety of mechanisms and control systems. Such mechanisms include a bale accumulating platform, a bale loading mechanism to pick up and deposit bales on the accumulating platform, a bale sliding mechanism, and a push-off or sliding mechanism to unload bales from the apparatus. The apparatus may be positioned in a variety of configurations and a chain tensioner mechanism is used to keep chains taut. The apparatus further comprises a control system that includes a computer device or controller, sensors and switches. The sensors and switches are configured to selectively provide input to the computer device or may be used independent of the computer device to control one or more mechanisms of the apparatus.

18 Claims, 10 Drawing Sheets

U.S. PATENT DOCUMENTS

| | | | |
|---|---|---|---|
| 6,053,685 A | 4/2000 | Tomchak | 414/24.5 |
| 6,079,926 A | 6/2000 | Cox et al. | 414/111 |
| 6,171,047 B1 | 1/2001 | Vandervalk | 414/24.5 |
| 6,220,811 B1 | 4/2001 | Bernecker | 414/555 |
| 6,240,712 B1 | 6/2001 | Meijer | 56/16.4 |
| 6,328,520 B1 | 12/2001 | Maclay | 414/111 |

HAY BALE STACKER

RELATED APPLICATIONS

This application claims priority to U.S. Provisional Patent Application Ser. No. 60/260,126, filed Jan. 5, 2001, entitled "HAY BALE STACKER."

BACKGROUND OF THE INVENTION

1. Field of the Invention

The present invention relates to systems and methods for loading, stacking, and/or handling large bales of hay. In particular, the present invention relates to a loading and stacking apparatus that incorporates a bale moving mechanism to rearwardly move a hay bale off a loading mechanism and onto a bale accumulating platform.

2. Background and Related Art

Traditional procedures for harvesting crops, such as hay, include the utilization of mobile baling devices that collect hay and form bales. Each hay bale is a collection of hay that may include one of a variety of shapes and sizes depending on the device employed in forming the bale. A typical "large" or "big" bale size ranges from 2 to 4 feet wide, 2 to 4 feet high, and up to 8 feet long. Each bale weighs from 500 to 2500 pounds, depending on the size of the bale.

Once formed, the bales are typically discharged onto the ground. Vehicles, such as wagons or trucks, are driven over the fields where the bales are located. The formed bales are loaded onto the vehicles by hand or by a lifting apparatus, such as a forklift. After a vehicle is completely loaded with bales, the vehicle is driven to a place of bale storage or utilization and a forklift is typically used to unload and/or stack the bales.

This process for loading and unloading bales has proven to be cumbersome and time-consuming, and involves two operations. As such, a variety of complex mechanisms have been developed and utilized to load and unload bales. For example, U.S. Pat. No. 4,249,842 discloses a self loading multiple bale trailer that comprises an elongated trailer frame with a belt conveyor extending from end to end and a lift fork for engagement at the lower periphery of a large round bale at the side of the trailer upon forward motion of a tow vehicle. The lift fork is supported on a frame that is connected by an arm to a sleeve slidable on a vertical shaft and having a hydraulic cylinder for lifting the bale. The sleeve is also rotatable about a vertical axis to swing the lifted bale a half circle from the side of the trailer to a position over the conveyor for deposit thereon. The conveyor is operable to move the deposited bale to a desired position along the trailer and may also be used to discharge the bale from the rear of the trailer or to re-engage the lift fork with the bale. In an alternative form, the bale may be handled by a penetrating spike instead of lift fork legs in unwinding the bale for feeding.

Alternatively, U.S. Pat. No. 4,971,504 discloses a bale handling apparatus, particularly for loading, stacking and retrieving large rectangular bales. The apparatus includes an elongated bed mounted on a vehicle adapted for forward loading of bales into a loading cradle pivotally connected to the front of the bed. The loading cradle includes two sections pivotally connected to each other such that the angle between the two sections changes during the loading cycle to support the bale and then push the bale onto the elongated bed. Curved loading forks projecting from one of the loading cradle sections are adapted to slide under a bale to be loaded and also aid in stabilizing the bales accumulated on the bed as the bed is pivoted from the horizontal loading position to a vertical position to create a bale stack that may be retrieved by the apparatus at a later time.

The apparatus described in U.S. Pat. No. 5,507,612 represents one of the more effective hay bale devices. A bale pick-up and stacking mechanism is incorporated into a flat bed truck. The apparatus provides substantial savings over conventional methods for loading bales, but may be somewhat difficult to operate and requires the dedication of a flatbed truck for the single purpose of loading and stacking bales. The apparatus includes a substantially improved bale loading mechanism that is mounted on a trailer towed by an offset hitch behind a tractor. The loading mechanism enables a bale loading device on the front of the trailer to be towed into contact with a bale so that grasping arms may engage the sides of the bale(s). The loading device is then actuated to upwardly lift the bale(s), whereupon the bale(s) slide rearwardly on the inclined accumulating platform of the trailer and lodge at the rearmost position. This operation is repeated until the accumulating platform and loading device are filled. The trailer is then towed to a storage location and the bale accumulation platform is tipped rearwardly to deposit the bales in a stacked position at the storage location.

The bale handling and transporting apparatus disclosed in U.S. Pat. No. 5,725,346 comprises a bale handler on a trailer or body that can be positioned to pick up bales located on either side of the body. The bale handler may have an upright boom, a boom arm, and a bale gripper. The boom is pivoted to move the boom arm and the bale gripper to either side of the body. The boom maybe adjusted in length and lowered to place a bale within the jaws of the bale gripper. A stabilizer supports the body during the bale lifting operation. The boom and boom arm are operated to lift the bale onto the trailer. A conveyor belt shifts bales along the length of the trailer in either direction. The belt is keyed to the trailer to prevent sideways shifting of the belt relative to the trailer body, such as when the trailer is on a hillside. The body may be articulated with first and second bed sections. When empty, one of the bed sections maybe pivoted or otherwise positioned to overlie the other bed section to reduce the overall length of the trailer. The rear end of the rearmost bed section maybe lowered and a tailgate dropped to facilitate bale unloading.

The bale loading apparatus disclosed in U.S. Pat. No. 6,171,047 includes a wheeled undercarriage having front and rear ends, a deck pivotally mounted by a pivot mount to the rear end of the undercarriage for supporting a row of bales thereon, and actuating component driven by a first drive to pivot said deck between a first generally horizontal position and a second generally vertical position. The apparatus also includes forks mounted to the rear of the deck, with the forks preferably composed of tines. The forks are positionable at substantially ground level and in a generally horizontal orientation when the deck is generally vertical. A conveyor is incorporated within the deck to convey a bale from the rear end of the deck to the front end thereof. A drive component is provided to drive the conveyor.

Furthermore, U.S. Pat. No. 6,220,811 discloses a vehicle bed, comprising a bed frame adapted for carrying a load, a fork including at least one tine, and a pivot mechanism adapted for pivoting the bed frame and the fork between a first position and a second position with respect to a vehicle frame. The fork is connected to an end of the bed frame and is substantially orthogonal to the bed frame. Loads are transported on the bed frame in the first position and are moved off or on the fork in the second position. The vehicle bed may be incorporated as part of a truck bed or as part of a trailer bed for a bale loading apparatus. The vehicle bed may include a lift mechanism including a lift cylinder adapted for lifting a load with respect to the vehicle frame to compensate for a load weight compressing a vehicle suspension. The bale loader includes a boom having a mast rotatably attached to a vehicle or trailer frame, a main boom pivotally attached to the mast, a jib boom pivotally attached to the main boom, and a head swivably attached to the jib boom. The boom is adapted for handling and stacking bales on the vehicle bed. The swivel head is preferably a two-in-one head adapted for handling dry bales and wet bales without puncturing plastic wrapped around the wet bales. The bale loader further includes at least one mobile outrigger operably attached to the vehicle frame and adapted for stabilizing the load. The mobile outrigger is telescopically extendible.

Thus, while a variety of traditional procedures and/or apparatuses exist for loading, unloading, and otherwise handling bales, the procedures and/or apparatuses have typically proven to be cumbersome, difficult to utilize, and/or time-consuming. Accordingly, it would be an improvement in the art to augment or even replace traditional procedures or apparatuses in order to simplify and enhance the operations of loading, unloading, and handling bales of hay.

SUMMARY OF THE INVENTION

The present invention relates to systems and methods for loading, stacking, and/or handling large bales of hay. In particular, the present invention relates to a loading and stacking apparatus that incorporates a bale moving mechanism to rearwardly move a hay bale off a loading mechanism and onto a bale accumulating platform.

Implementation of the present invention embraces a powered apparatus that slides the bales rearwardly from the loading mechanism to a rearward position on the accumulating platform, thereby eliminating the need for a steeply inclined accumulating platform to cause the bales to slide rearwardly due to gravity. Implementation of the present invention further embraces an integration of the apparatus with a computer device to selectively operate the apparatus and to simplify such operation.

In one implementation, the apparatus includes an offset wheeled trailer that may be pulled by a tractor, truck or the like, a bale accumulating platform on the trailer, a bale loading mechanism to pick up and deposit bales on the accumulating platform, and a bale sliding mechanism. The bale sliding mechanism comprises a dual chaining mechanism that wraps around the loading mechanism and the accumulating platform. The dual chaining mechanism runs parallel and just under the upper surface of the loading mechanism and accumulating platform. A pushing mechanism is connected to the dual chaining mechanism and is perpendicular to the direction of travel of the chaining mechanism. The pushing mechanism is positioned in front of the bales and acts as a power slider mechanism that forces the bales rearwardly on the trailer.

In one implementation a chain tensioner is used to keep the chain taut, thereby preventing a substantial loss of chain length as the loading mechanism is lowered from an up position to a down or pick-up position. A pivotal arm with a sprocket attached to the end of the arm is used to push the chain away from two stationary sprockets on the bottom side of an accumulating platform. The pivotal arm is powered to keep a constant pressure on the chain.

A control mechanism may be used that comprises a computer device, such as a controller, a logic device, or another such computer device. The computer device receives information from sensors relating to the position of the various mechanisms, and may also receive information from an operator through the use of electrical switches. The computer device provides control to the apparatus through logic created by a computer program preserved in memory. The control mechanism further includes a flow control device to divert oil pressure to a mechanism for implementation of a particular action. The flow control device may be powered to create a pressurized flow. The flow control device may receive a signal from the computer device to subsequently provide pressurized oil to specific mechanisms in order to cause a particular action to occur.

The use of the computer program simplifies the operation of the apparatus by allowing the apparatus to be controlled by the use of four switches instead of seven, which is typically needed for an apparatus having seven different powered mechanisms. The computer program determines the actions that need to occur so the operator does not have to continually toggle switches in order to cause apparatus functions to occur. The computer program also enables the continuation of an action once that action is initiated by the operator.

Further implementation of the present invention allows for the ability to control the speed of the power slider mechanism as it moves the bales from the front of the loading platform to the most rearward position on the bale accumulation platform. The power slider mechanism begins slowly and picks up speed as the row of bales is pushed to the rear of the apparatus. This is enabled by writing the program so that the computer pulses the current traveling to the flow control valve. The faster the pulse to the flow control valve, the greater the flow to the orbit motor, which drives the bales. The computer program enables the computer to speed up the pulses as the position of the chain moves rearward from the first stop position. This automatically speeds up the power slider mechanism as the bales are pushed from the front to the rear of the apparatus. The rate of acceleration may be modified by a dial that is read by the computer device. The computer program may provide the necessary adjustments so that the computer device increases or decreases the rate of acceleration of the power slider mechanism by respectively sending out pulses that are faster or slower depending on where the dial is set.

While the methods and processes of the present invention have proven to be particularly useful in the area of hay or feed bales, those skilled in the art can appreciate that the methods and processes can be used in a variety of different applications and in a variety of different areas of manufacture to pack, transport, unpack and otherwise handle large loads.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

In order that the manner in which the above recited and other features and advantages of the present invention are obtained, a more particular description of the invention will be rendered by reference to specific embodiments thereof, which are illustrated in the appended drawings. Understanding that the drawings depict only typical embodiments of the present invention and are not, therefore, to be considered as limiting the scope of the invention, the present invention will be described and explained with additional specificity and detail through the use of the accompanying drawings in which.

DETAILED DESCRIPTION OF THE INVENTION

Figure 1:
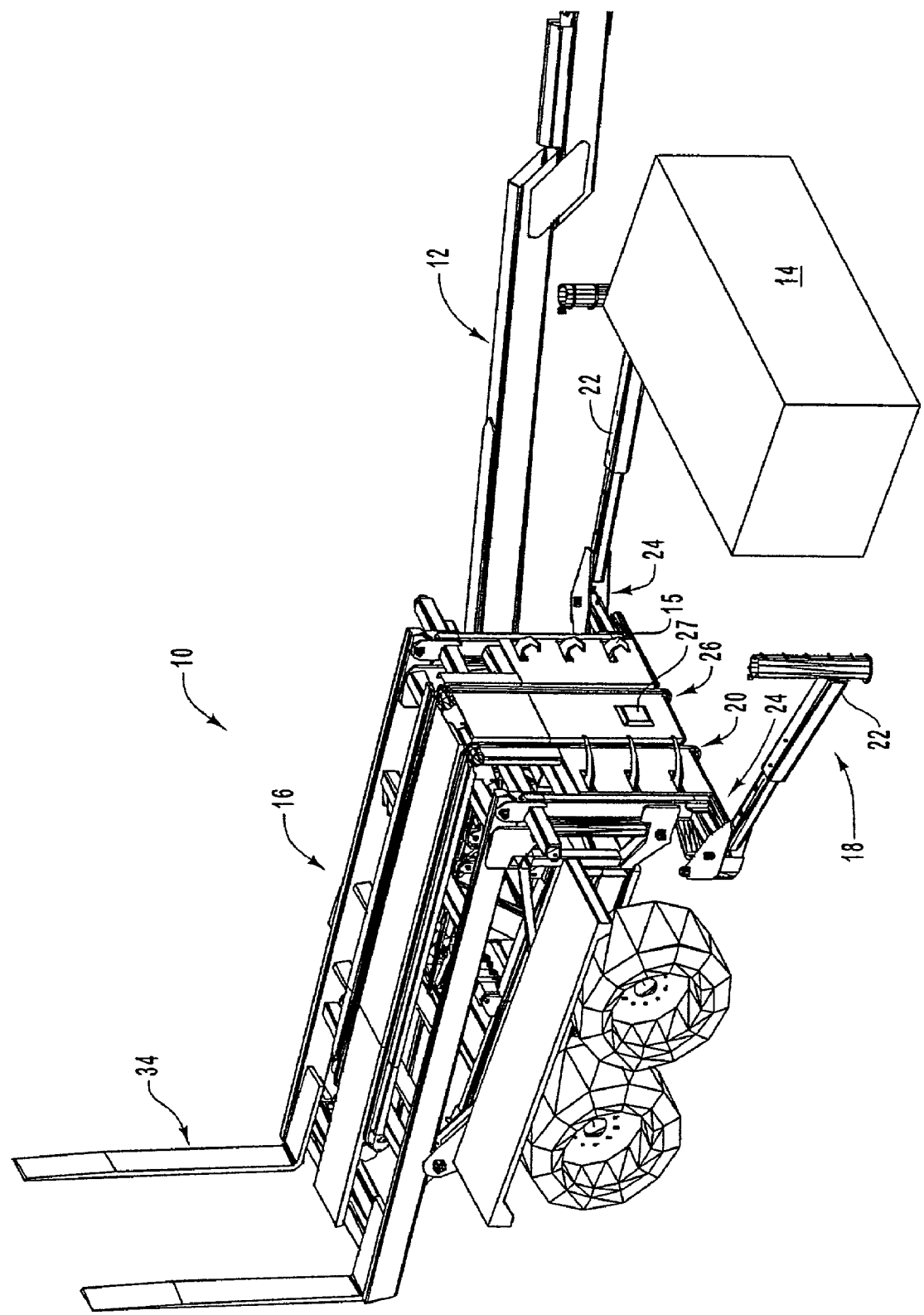
FIG. 1 illustrates a perspective view of a representative embodiment of the present invention in a first position, wherein the apparatus is approaching a bale with a bale accumulating platform horizontal, a loading platform down, alignment arms open, and grab hooks out.

The present invention relates to systems and methods for loading, stacking, and/or handling large bales of hay. In particular, the present invention relates to a loading and stacking apparatus that incorporates a bale moving mechanism to rearwardly move a hay bale off a loading mechanism and onto a bale accumulating platform.

Embodiments of the present invention take place in association with a powered apparatus that may be used to rearwardly slide a load, such as a hay bale, feed bale, or other load, from a loading mechanism to a rearward position on an accumulating platform. As such, the need for a steeply inclined accumulating platform to cause the load to slide rearwardly is prevented. Embodiments of the present invention further embrace the utilization of a computer device, such as a logic controller or another computer device to control the apparatus in order to simplify the operation thereof.

In the disclosure and in the claims, the term "bale" shall refer to any load that may be loaded, unloaded, or otherwise handled in accordance with the present invention. Examples of such bales include hay bales, feed bales, and other large loads.

The following disclosure of the present invention is grouped into two subheadings, namely "Handling Bales" and "Providing Control to Mechanisms." The utilization of the subheadings is for convenience of the reader only and is not to be construed as limiting in any sense.

Handling Bales

As provided above, embodiments of the present invention embrace the loading, stacking, and/or handling of large bales. Such manipulation or handling of bales is performed through the utilization of a variety of different mechanisms in accordance with the present invention, as will be discussed below. Briefly, a loading mechanism loads a bale onto an accumulating platform and the bale is selectively pushed or located onto the accumulating platform. As a series of bales are loaded and selectively located so that the accumulating platform is fully loaded, the platform is raised to a vertical position, which stacks the accumulation of bales on a combination of fork arms. An unloading apparatus may then be used to push or initiate movement of the stack of bales to remove the bales from off the fork arms.

Distinguishing features of embodiments of the present invention include the angle of the platform both in the horizontal and vertical positions, and the use of a tandem axle. In the horizontal position, the angle of the accumulating platform is considerably less due to the use of a power slider mechanism that forces bales backward on the platform instead of requiring the use of an inclined plane and gravity. In the vertical position, the platform is generally perpendicular with the ground to allow an unloading mechanism to push or remove the accumulated bales from off a combination of fork arms. The tandem axle supports the apparatus in maintaining stability as rows of bales are loaded and located on the platform. A variety of other distinguishing features exist, including the use of a computer-aided controller and a "bale on" paddle, as will be discussed below.

With reference now to FIG. 1, a representative embodiment of the present invention is illustrated as apparatus 10, which may be used to load, unload, and handle bales. In the illustrated embodiment, apparatus 10 includes attachment device 12, which may be used to couple apparatus 10 to a vehicle to enable apparatus 10 to be pulled by the vehicle and selectively positioned by an operator in the vehicle. Attachment device may include a mechanical coupler, such as a hitch, and an electronic coupler. The electronic coupler enables signals that are initiated by the operator to be received by apparatus 10, as will be further explained below.

As apparatus 10 is selectively positioned to load a bale 14 onto a bale accumulating platform 16, a loading mechanism 18 may be employed to load bale 14 onto platform 16. Loading mechanism 18 includes a loading platform 20, loading arms 22 and various grab hooks 15. Thus, to load bale 14 onto platform 16, the bale 14 may be placed between open arms 22 by towing the apparatus 10 with a vehicle (not shown), such as a tractor or truck. The arms 22 are closed by the action of alignment cylinders 24. The loading platform 20 is then raised slightly to pick the bale 14 off the ground. Grab hooks 15 are engaged to hold the bale 14 in place on the loading platform 20. The arms 22 may then be reopened to receive a second bale (not shown). The second bale is placed between the arms 22 and picked up by closing the arms 22 and raising the loading platform 20. The first and second bales may be loaded individually or together.

Figure 2:
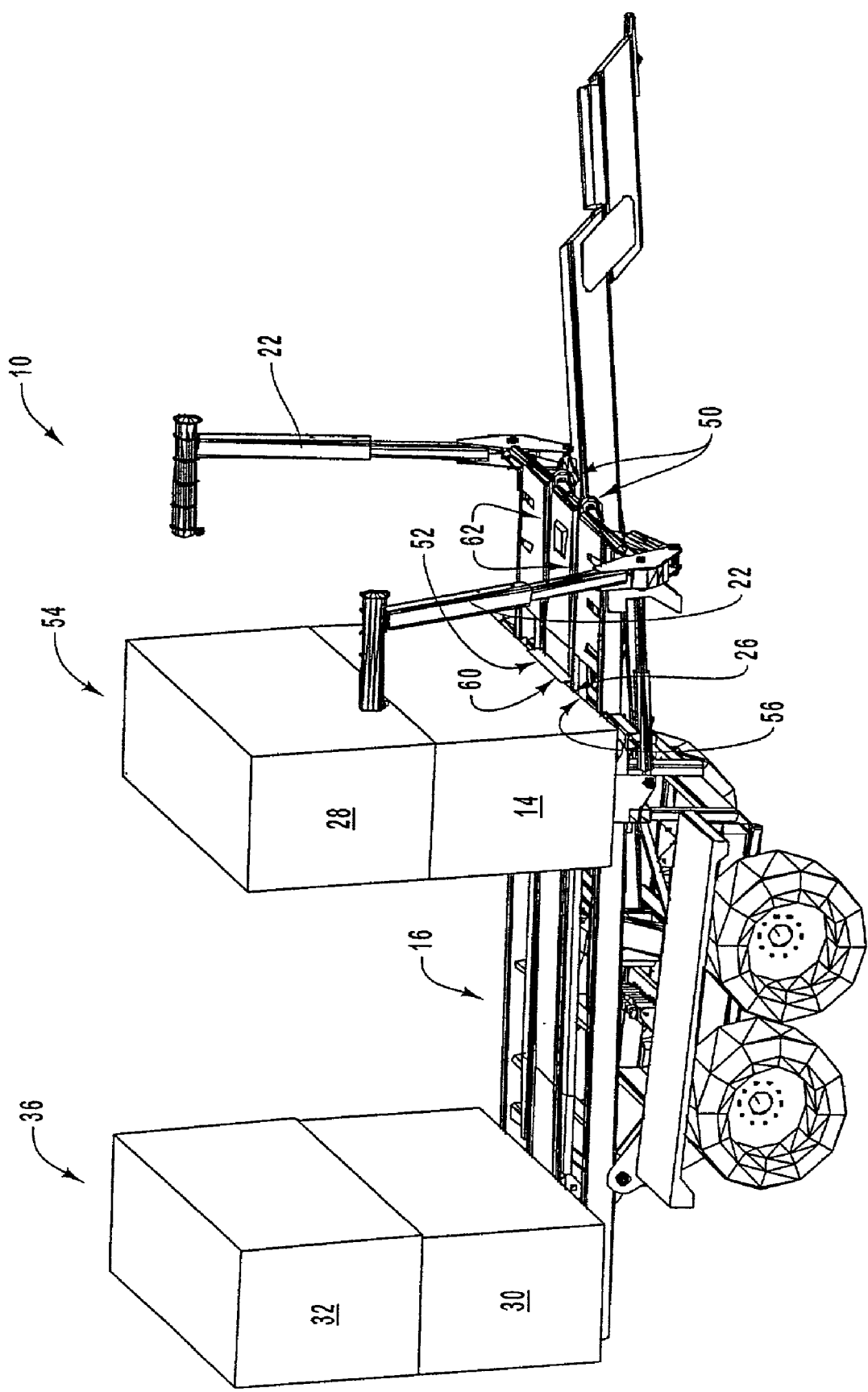
FIG. 2 illustrates a perspective view of the embodiment of FIG. 1 with loaded bales being positioned on a bale accumulation platform using a power slider mechanism.

Once the loading platform 20 is raised so that platform 20 is parallel with the bale accumulation platform 16, grab hooks 15 are retraced and a power slider mechanism 26 is positioned in front of the bales. This is illustrated in FIG. 2, where bale 14 is located on accumulating platform 16. FIG. 2 also illustrates the second bale, illustrated as bale 28, which is stacked on top of bale 14. FIG. 2 further illustrates bales 30 and 32, which were previously loaded onto platform 16 and selectively located at the rear of platform 16 by the use of power slider mechanism 26.

Once bales 14 and 26 are located on platform 16, arms 22 are opened to allow power slider mechanism 26 to move bales 14 and 28 rearwardly on platform 16. Once the bales are selectively positioned against one or more forks 34 (FIG. 1) or against a previous bale row 36 (FIG. 2), power slider mechanism 26 is returned to a position under loading platform 20. The loading platform 20 may then be lowered to pick up additional bales in a similar manner. The last row of bales loaded onto apparatus 10 may be held by the loading platform 20.

Figure 3:
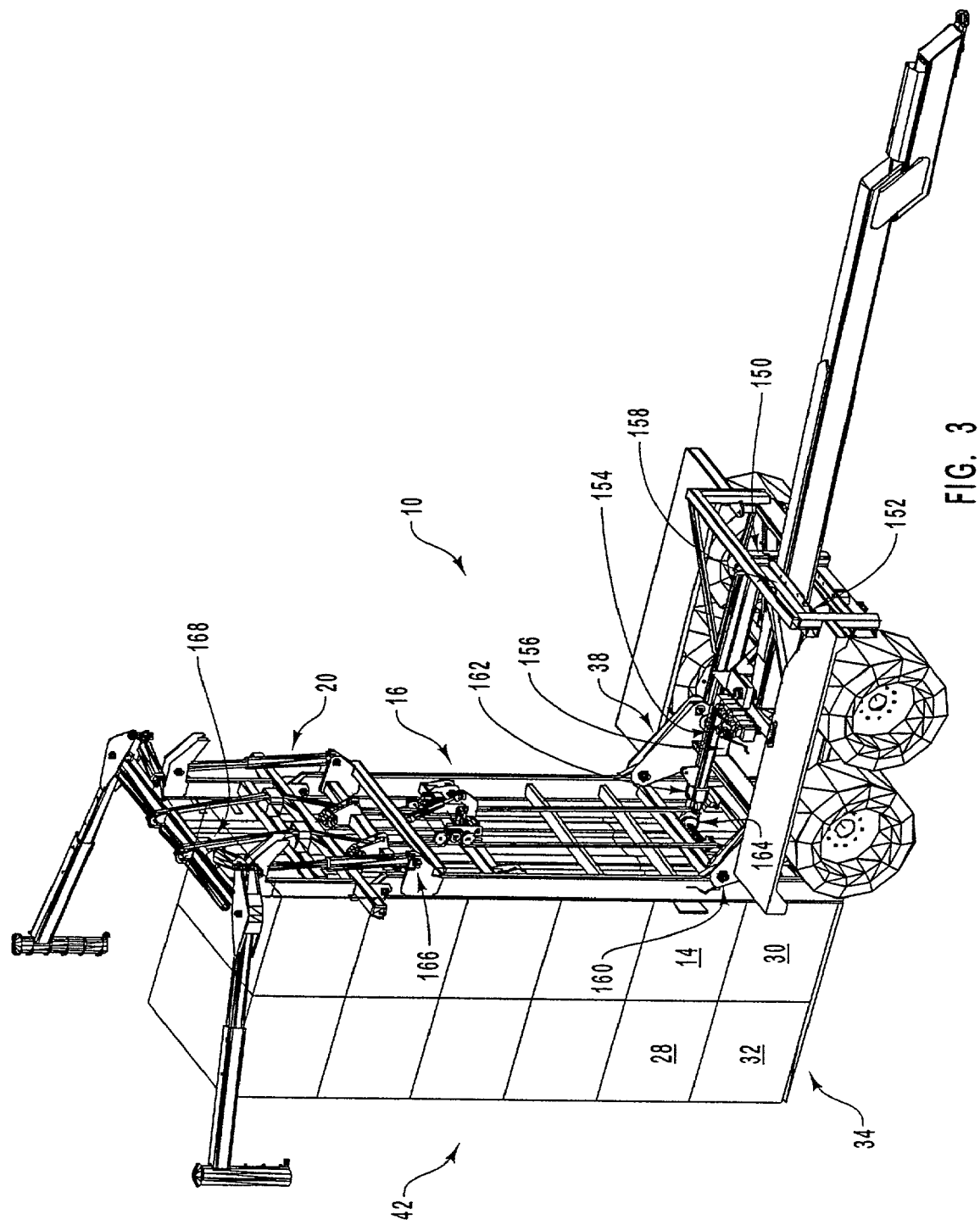
FIG. 3 illustrates a perspective view of the embodiment of FIG. 1 in a second position with the bale accumulating platform vertical, and illustrating a representative placement of sensors.
Figure 4:
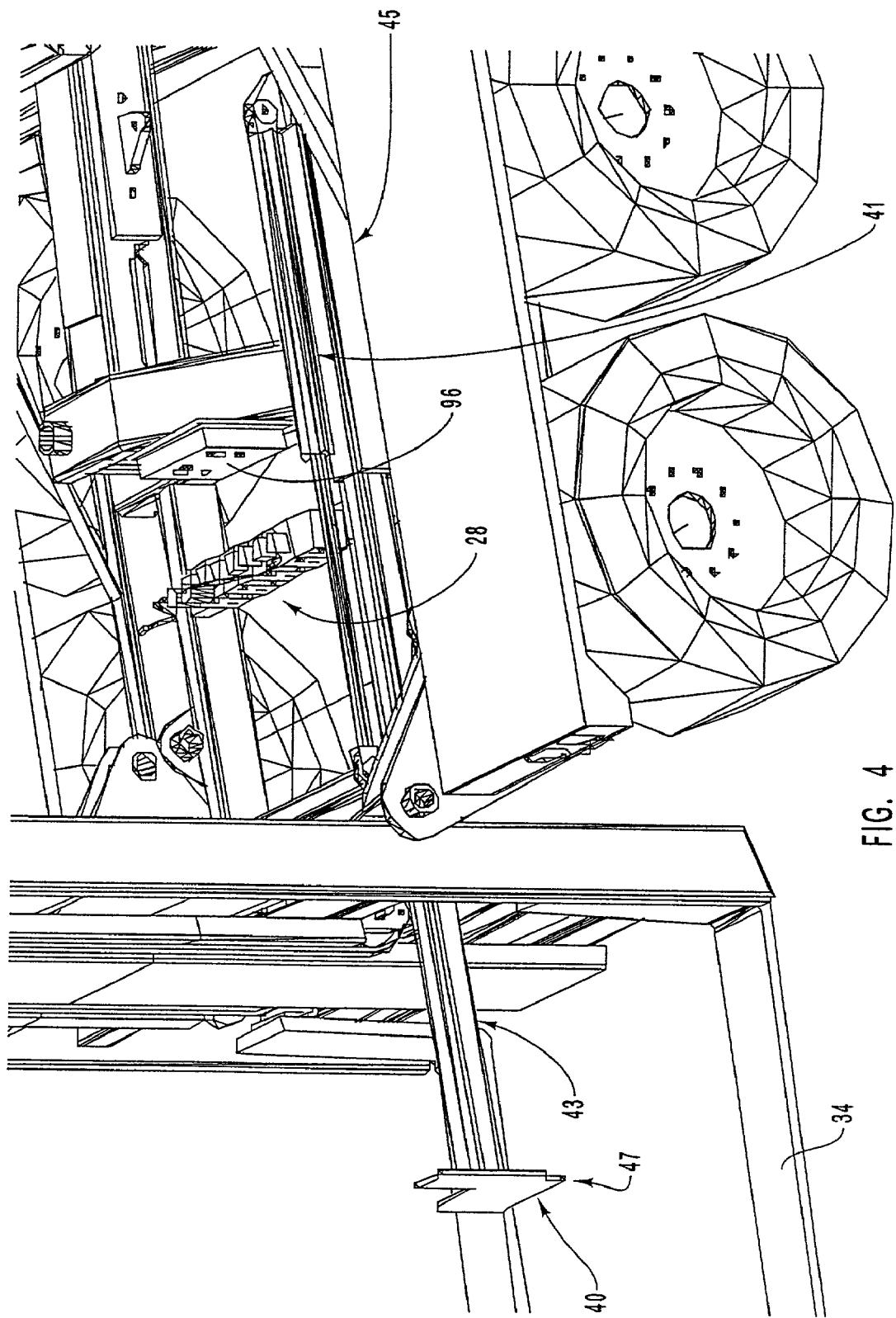
FIG. 4 illustrates a perspective view of a representative push-off mechanism that may be used to initiate removal or unloading of a bale stack from the apparatus.

With reference now to FIG. 3, once all of the bales have been loaded, apparatus 10 may be towed to a location where the bales are to be unloaded. Those skilled in the art will appreciate that apparatus 10 may be towed in either a horizontal or vertical position. The bale accumulation platform 16 is raised by cylinders 38 and a "push-off" mechanism 40, illustrated in FIG. 4, is used to initiate the pushing of the bales 42 (FIG. 3) off forks 34. The apparatus may be pulled so as to completely remove forks 34 out from under bales 42, thereby leaving a stack of bales 42. After the forks 34 have been removed, the bale accumulation platform 16 may be lowered so that additional bales may be picked up and stacked.

As illustrated in FIG. 4, push-off mechanism 40 assists the removal of bales 42 from off forks 34. In one embodiment, push-off mechanism 40 is mounted to the frame of apparatus 10, is powered by a hydraulic cylinder 41, and comprises a shaft 43 that is configured to slide in relation to a guide 45. If the bale accumulation platform is up, the push plate 47 may be located between the members of the bale accumulation platform and used to push or initiate the movement of bales 42 (FIG. 3) off forks 34 a sufficient distance to allow bales 42 to continue to slide off forks 34 by moving, (e.g., towing) apparatus 10 away from bales 42. The push plate 47 is of a sufficient surface area so as to prevent puncture of bales 42 and to force bales 42 off the forks 34 when the bale accumulation platform 16 is up.

With reference back to FIG. 2, the power slider mechanism 26 comprises two chains 50 and a push bar 52 perpendicularly connected to chains 50. The push bar 52 moves from a position under the loading platform 20 to a position in front of a row of bales 54 on the loading platform 20, and moves down platform 16 to enable selective location of the bales on platform 16. The push bar 52 is returned to a location under loading platform 20 to selectively locate the next row of bales loaded by apparatus 10.

Figure 5:
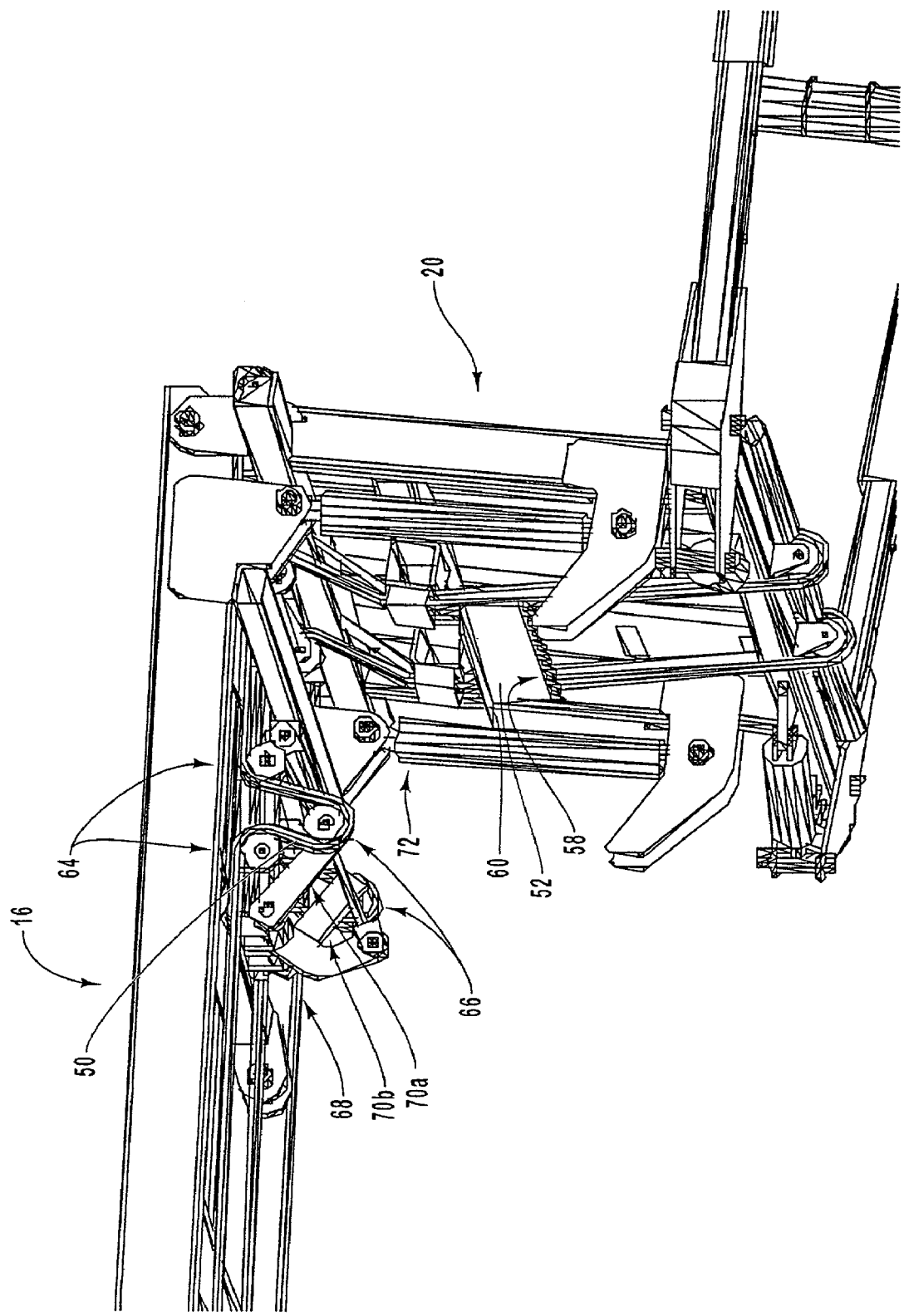
FIG. 5 illustrates a perspective view of the under side of the bale loading and bale accumulating platforms, with the platforms in a transverse relationship.

Push bar 52 is designed to push the bales rearwardly on platform 16 without causing a particular row of bales to tumble. In one embodiment, this is performed by lifting the trailing edge 56 of a row of bales, such as row 54. As illustrated in FIG. 5, in one embodiment push bar 52 is flat with a toothed edge 58 protruding upward from the leading edge. The toothed edge 58 pokes into the bottom side of a bale as it goes around the front of the loading platform 20, thereby stopping the slippage of the push bar 52 under the particular bale. The trailing edge of the push bar 52 includes a lip 60 (FIG. 2) that extends upwards. This lip 60 prevents the slippage of the push bar 52 if the toothed edge 58 is not aggressive enough to stop the slippage.

In one embodiment, chains 50 (FIG. 2) of power slider mechanism 26 are spaced as far apart as possible so as to prevent them from interfering with grab hooks 15 (FIG. 1). An underneath position of the loading platform 20 is illustrated in FIG. 5. Chains 50 travel around loading platform 20 and at least a portion of bale accumulation platform 16. In one embodiment, chains 50 travel around loading platform 20 and down a distance of platform 16 that corresponds to a one furthermost bale row at the end of the bale accumulation platform 16.

Chains 50 travel in troughs 62 near the top surface of loading platform 20 and the top surface of bale accumulation platform 16 (FIG. 2). Troughs 62 are deep enough to ensure that chains 50 are below the top surface of the bale accumulation platform 16 and loading platform 14 to prevent chains 50 from cutting any strings (not shown) on the bales, which are already located on the bale accumulation platform 16 or loading platform 20.

Figure 6:
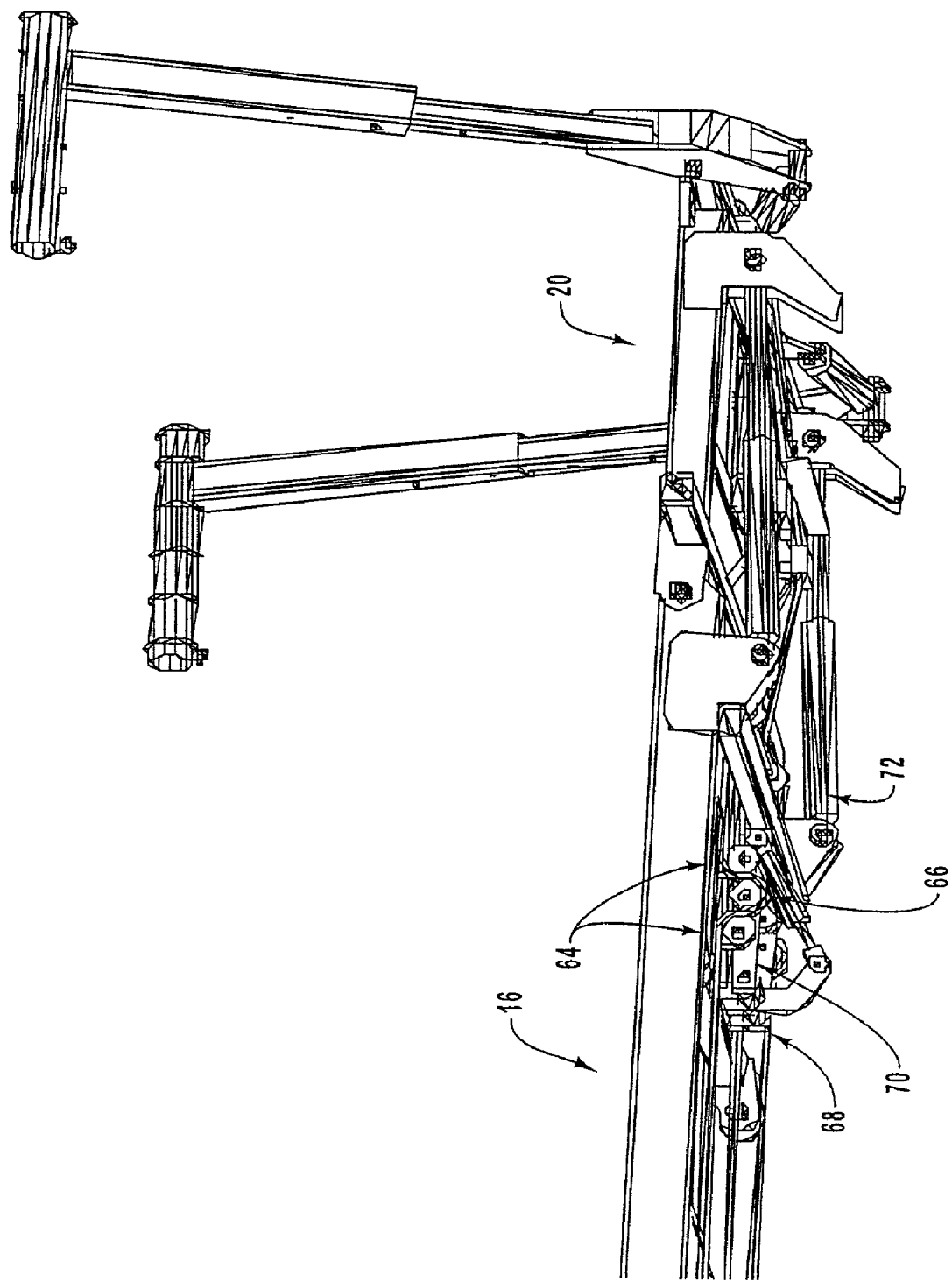
FIG. 6 illustrates a perspective view of the under side of the bale loading and bale accumulating platforms, with the platforms in a parallel relationship.

With reference back to FIG. 5, underneath the bale accumulation platform 16 are located two sets of two stationary idler sprockets 64 that are configured to receive chains 50 and are connected to bale accumulation platform 16. Between each set of sprockets 64 is located another sprocket 66 that is configured to receive a chain and is rotated about a pivot 68 by an arm 70. Arm 70a is connected to arm 70b and enables rotation of middle sprocket 66 about pivot 62. Both arms 70 are simultaneously pushed by hydraulic cylinder 72 in order to push both middle sprockets 66 down between the outer sprockets 64. The piston end of hydraulic cylinder 72 is supplied constant fluid pressure from a pressure control device. This fluid pressure is adjustable and the higher the pressure the greater the tension that is placed on chains 50. As illustrated in a combination of FIGS. 5 and 6, this action eliminates slack in chains 50 as the loading platform 20 is moved from one position to another, and maintains a constant tension on the chains 50.

Figure 7:
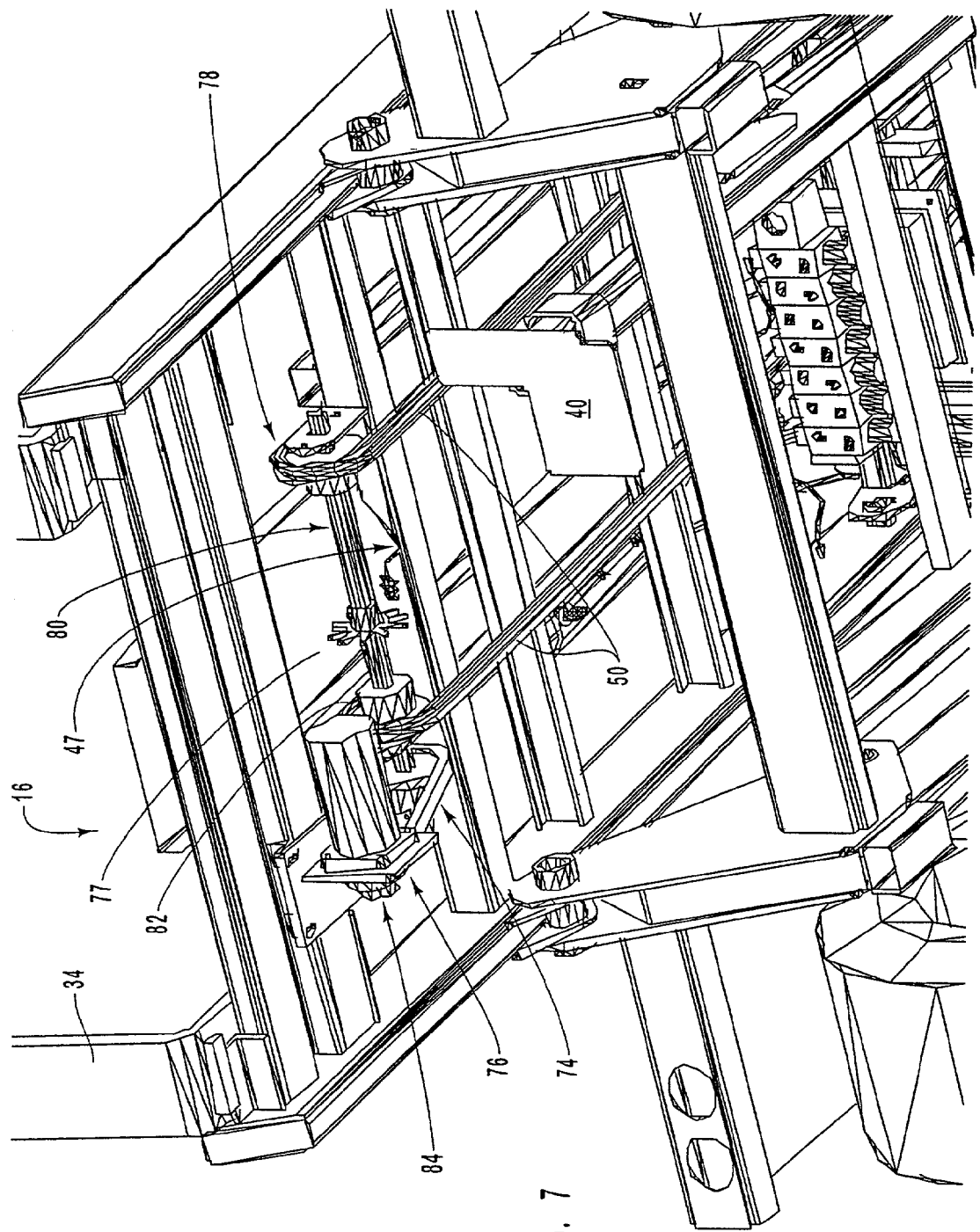
FIG. 7 illustrates a perspective view of the underside of the rear portion of the bale accumulating platform.

Power slider mechanism 26 is powered by chain 74, illustrated in FIG. 7, that is driven by an hydraulically driven orbit motor 76, which is rigidly connected to an underneath portion of bale accumulation platform 16. The dual chains 50 wrap around two sprockets 78 and 82, that are rigidly connected to a shaft 80 at the rearward end of bale accumulation platform 16. Chain 74 wraps around sprocket 82 and around sprocket 84, which is rigidly connected to a shaft protruding out of orbit motor 76. As orbit motor 76 is powered by pressurized fluid, motor 76 rotates chain 74 in either direction to cause push bar 52 (FIG. 2) to move in either direction.

In one embodiment and with reference back to FIG. 1, paddle 27 is designed so that as a bale 14 is pushed forward by loading platform 20, paddle 27 is pushed in flush with loading platform 20 instead of protruding out in front of the surface of the loading platform, indicating the presence of bale 14. Paddle 27 is positioned in association with loading platform 20 in such a way that paddle 27 will only be pushed in by bales that are flush with the top surface of the loading platform 20. The surface of paddle 27 maybe of sufficient area so as not to indent the bales, but may be pushed back against the spring force to cause paddle 27 to be flush with a front surface loading platform 20.

Paddle 27 is held in place by two bolts extending at right angles from the bottom side of loading platform 20. Two holes in a bar extending across the back of paddle 27 slide over the bolts. A compression spring of sufficient force to push paddle 27 out is placed over the bolts. A washer and nut are used to hold the spring and paddle 27 in place. More force may be asserted to the paddle by tightening the nuts on the bolts.

Providing Control to Mechanisms

As provided above, a variety of mechanisms are utilized to selectively load, unload and handle bales in accordance with the present invention. The mechanisms may be controlled in a variety of manners, including the use of hydraulic, mechanical, and/or electrical devices or systems. The following provides a discussion relating to the control of the various mechanisms employed in accordance with the present invention.

Figure 8:
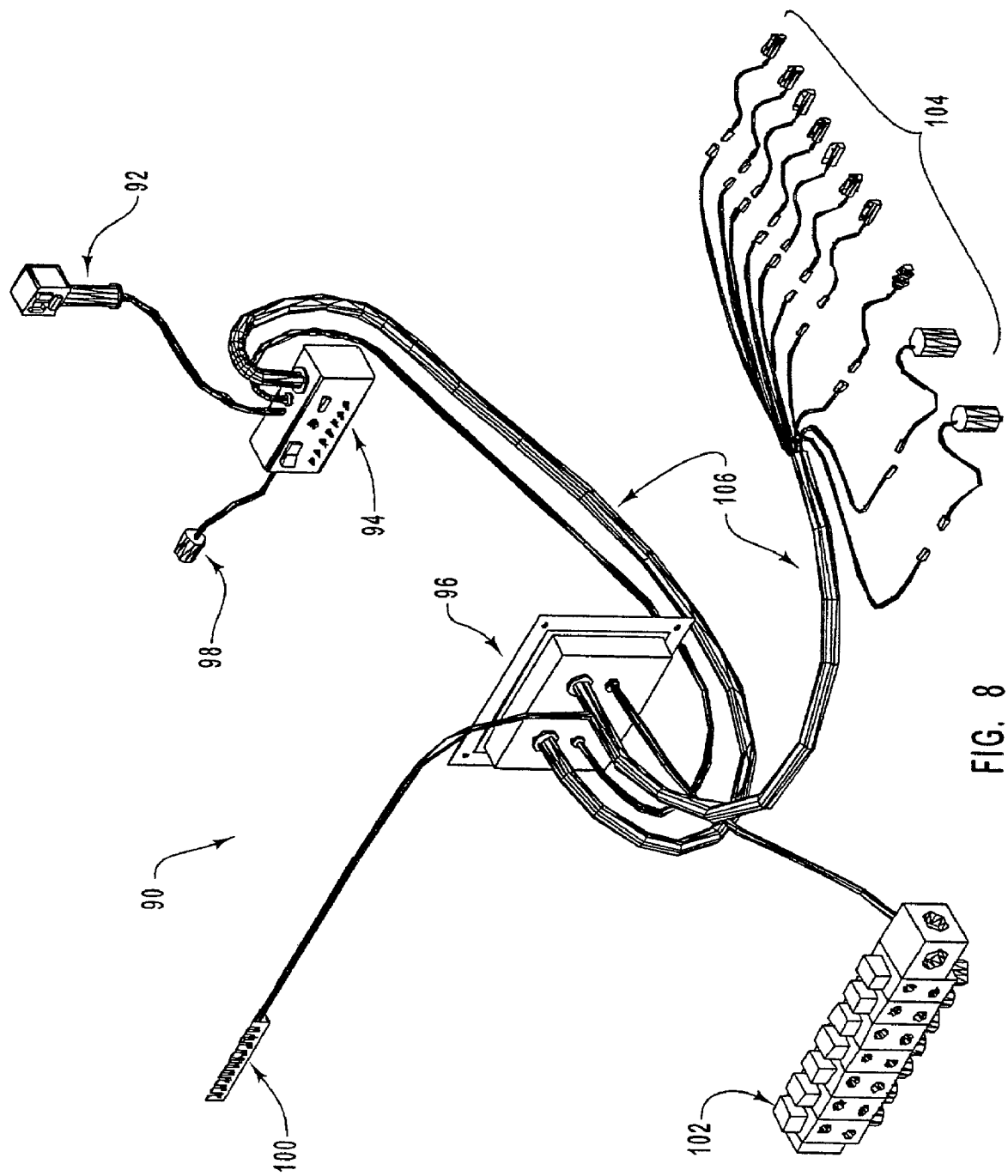
FIG. 8 illustrates a perspective view of an embodiment of a representative control system that may be used to control mechanisms in association with the present invention.

With reference to FIG. 8, a representative control system is illustrated as system 90, which is used to selectively control various mechanisms of apparatus 10 (FIG. 1). In the illustrated embodiment, system 90 includes a handheld control 92, a control box 94, a computer device 96, a flow control device 98, a light bar 100, a flow control device 102, and various other sensors or devices 104 that are connected by wires 106. In one embodiment, the sensors are located on apparatus 10 as illustrated in FIG. 3, as will be discussed below.

With reference now back to FIG. 4, computer device 96 may be located on the apparatus in close proximity to flow control device 28 and secured to the frame of the apparatus under the center of the bale accumulation platform. The computer device 96 is configured to continuously monitor switches and sensors, and to selectively send out an appropriate signal to activate an appropriate control device to activate an appropriate mechanism. Computer device 96 includes a processing system, such as a microprocessor, that may be programmed to selectively control/operate apparatus 10 as disclosed herein.

Computer device 96 receives input from a variety of different sources, such as from the operator selectively utilizing switches, and/or from sensors located on the apparatus. In one embodiment, two different types of sensors are utilized. One type is normally open and closes when a piece of metal is in front of a target area. The other type is a pressure switch that is normally open and closes when pressure in a fluid is increased to a specified level.

Figure 9:
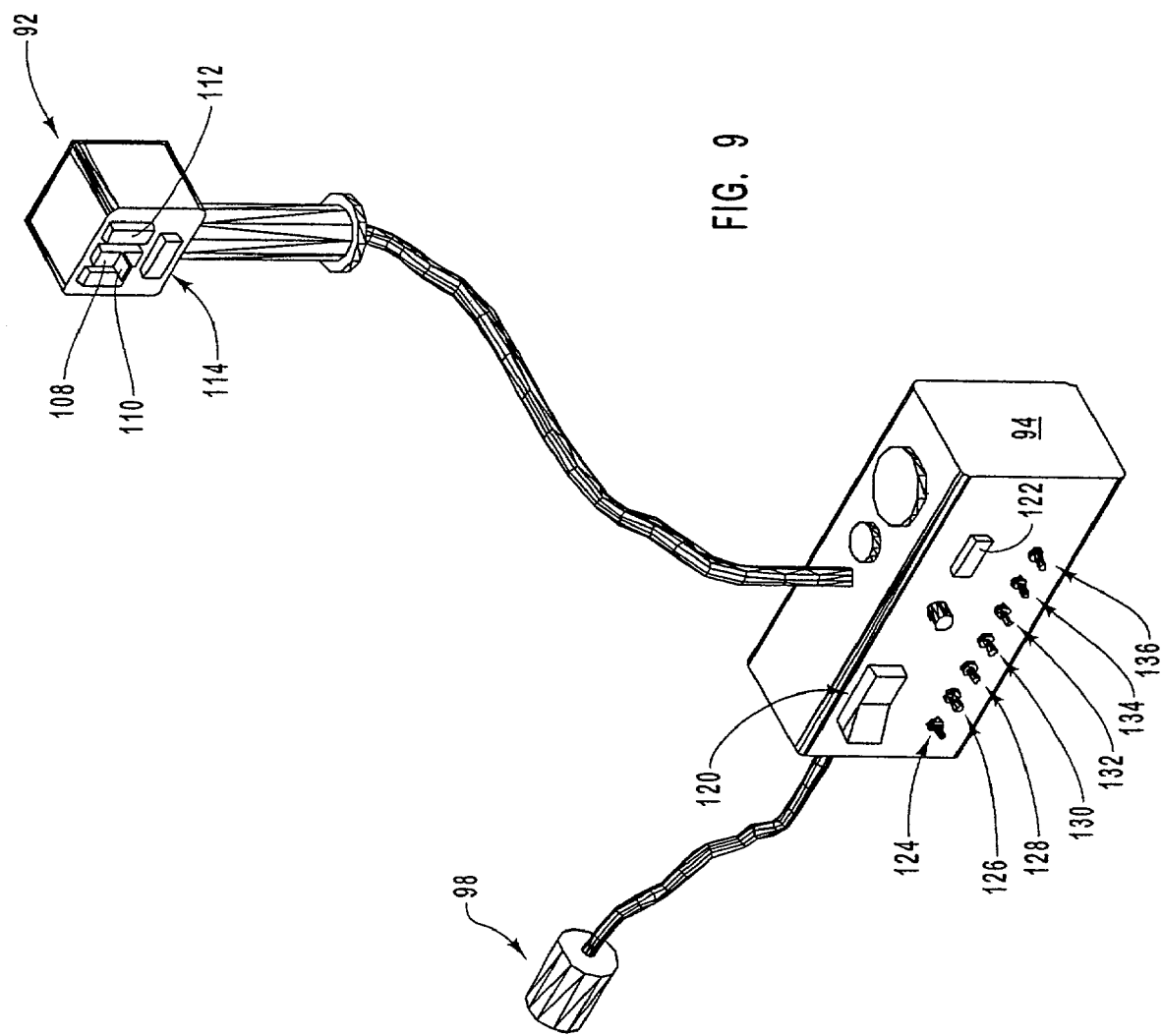
FIG. 9 illustrates a more detailed view of switches included in the control system of FIG. 8.

Handheld control 92 may be gripped by an operator's hand and switched with the operator's thumb. A right-handed or left-handed configuration may be employed. With reference to FIG. 9, in one embodiment the switches of handheld control 92 are positioned so that the middle switch 108 is a loader switch and has an extended lever 110 to identify switch 108 from the other switches, and to facilitate operation. Switch 110 is a "push-offs" switch. Switch 112 is a bed switch. Switch 114 is a hitch switch that provides horizontal motion for switching and corresponds to the horizontal or sideways motion that apparatus 10 is able to undergo. In one embodiment, the switches are three position spring switches to the center.

In a further embodiment, control box 94 is a size small enough to fit in the cab of a truck or tractor and not obstruct the view of the operator, yet big enough to facilitate the control of the switches located thereon by an operator. In the illustrated embodiment, the switches of the control box 94 are arranged to facilitate control of the individual switches and are grouped according to the sequence that they are used. The on/off switch 120 selectively provides power from the vehicle to the electrical systems of the apparatus 10 (FIG. 1). Switch 120 is a two position switch and is spring-loaded to stay in either an "on" or "off" position. An automatic/manual switch 122 sends a signal to computer device 96 (FIG. 8) to indicate whether the operator wishes to operate apparatus 10 in a manual or automatic mode. Switch 122 is a two position switch and is spring-loaded to stay in either selectable position.

The other switches are all three position switches and spring to the center position when released. An alignment arms switch 124 provides a signal to computer device 96 to close arms 22 (FIG. 1) when the operator forces the switch to the closed side and provides a signal to computer device 96 to open arms 22 when the operator forces the switch to the open side. In the middle position, the computer device 96 receives no signal and halts any motion of the arms 22. The rest of the switches 126–136 may similarly be utilized in three positions.

Thus, as illustrated in FIGS. 8 and 9, a particular operator may access one of two sets of switches that send signals to the computer device 96 through a variety of wires. One set of switches is placed in control device 98, located in the vehicle, and the other set is placed in a handheld control 92. The two sets are connected by wires, and are connected to computer device 96 by wires. In one embodiment, the switches are labeled to indicate the mechanical devices with which they are associated.

The control box 94 receives power through a wire, which is connected to the common electrical system of the vehicle. The control box 94 includes a switch to turn electrical power "on" or "off" to selectively power the computer device 96 and the flow control device 98. Another switch on the control box 94 is an automatic/manual switch that determines the switches that are functional. Other switches and their positions on the control box may include a loader up/hold/down switch, an alignment arms in/hold/out switch, a grab hooks engage/hold/disengage switch, a power slider back/hold/return switch, a hitch incline/hold/offset switch, a bed up/hold/down switch, and a push-off out/hold/out switch. In one embodiment, the switches may be momentarily positioned transverse in relation to a center position and will automatically return to the center position when released. With the automatic/manual switch on the control box in the manual position, only the control box switches are functional, except for the push-off switch on the handheld device.

Furthermore, switches on control box 94 may activate the corresponding mechanical devices by utilizing a computer program. The program checks the sensors to make sure the mechanical devices will not crash into each other before activating the flow control device. In one embodiment, the only exception to this is the loader up switch, which will make the loading platform go up even if the hitch is not offset and/or if the bale accumulation platform is not down. In one embodiment, with the automatic/manual switch in the automatic mode, the switches on the handheld control 92 work with the exception of the push-off switch on the control box. The use of the computer program will be further discussed below.

As illustrated herein, the sensors are located in positions to indicate the position of a mechanical device or to indicate pressure used in operating a mechanical device. In the present embodiment, all of the sensors are wired so as to be normally open, and close based on a position of a mechanical device, or a pressure applied to a mechanical device from the flow control device, as will be discussed below. The sensors are located as indicated in FIG. 3.

In the illustrated embodiment, and with reference to FIG. 3, two sensors indicate the position of the coupler or hitch, whether it is inline (sensor 150) or offset (sensor 152). Two sensors indicate whether the alignment arms 22 are open (sensor 156) or closed (sensor 154) tight enough to hold a bale of hay by the pressure applied to the driving device of the alignment arms. One sensor (sensor 166) indicates the position of the loading platform 20. One sensor (sensor 158) indicates the position of the bale accumulation platform 16. One sensor (sensor 162) indicates the position of the push-off mechanism. One sensor (168) indicates a bale being located against loading mechanism 20. Moreover, one sensor (sensor 164) indicates the movement of the power slider mechanism according to the program preserved in computer memory.

The sensors maybe activated by pressure or by movement. For example, sensors that are activated by pressure include a sensor that closes when there is enough pressure in the hose transferring fluid to power the piston end of an alignment arm cylinder, or to power the rod end of the alignment arm cylinder.

Sensors that are activated by movement includes a sensor that may be secured to the frame of apparatus 10 (FIG. 3) and closes as the hitch moves in front of a target area, a sensor that closes as the hitch moves offset from the front of the target area, a sensor that is activated by the movement of the loading platform 20 (FIG. 3), a sensor that is secured to bale accumulation platform 16 and that closes as loading platform 16 reaches a vertical position by sensing a piece of metal attached to the loader cylinder moving in front of the target area, a sensor that is activated by the movement of the bale accumulation platform 16, or a sensor that is secured to the frame of apparatus 10 and closes as the bale accumulation platform 16 is lowered by sensing metal on the bale accumulation platform moving in front of the target area.

Additional sensors that are activated by movement include a sensor that is secured to the bale accumulation platform 16 and closes when the bale accumulation platform is in the mid position and remains closed as it is raised to the vertical position by sensing a piece of metal attached to the frame of apparatus 10 that remains in front of the target area while the bale accumulation platform 16 is raised from the mid position to the vertical position. Another is a sensor that may be activated by the movement of the push-off mechanism 40, such as one that is secured to the frame of apparatus 10 and closes as the push-off mechanism 40 moves to the full in position by sensing a piece of metal connected to the push-off plate 47 (FIG. 4) that moves in front of the target area. Another is a sensor that is activated by a "bale on" paddle by being secured to the bottom side of the loading platform 20 and closing as the "bale on" paddle is forced inward by a bale that causes a piece of metal connected to the paddle to move in front of the target area. Another is a sensor that is activated by the movement of a gauge wheel 77 (FIG. 7) by being secured to the bottom of the bale accumulation platform 16 and closes every time one spoke of the gauge wheel moves in front of the target area. (In the illustrated embodiment, gauge wheel 77 comprises 15 spokes, enabling the sensor to open and close 15 times per revolution of gauge wheel 77.) With reference back to FIG. 8, a light bar 100 of the system may be used to detect the sensors that are sending a signal to the computer device 96. The light bar 100, in conjunction with a chart, will assist the operator in determining and identifying problems if the switches do not cause appropriate mechanisms to work. The sensors typically include a light that will illuminate if a sensor is closed.

Figure 10:
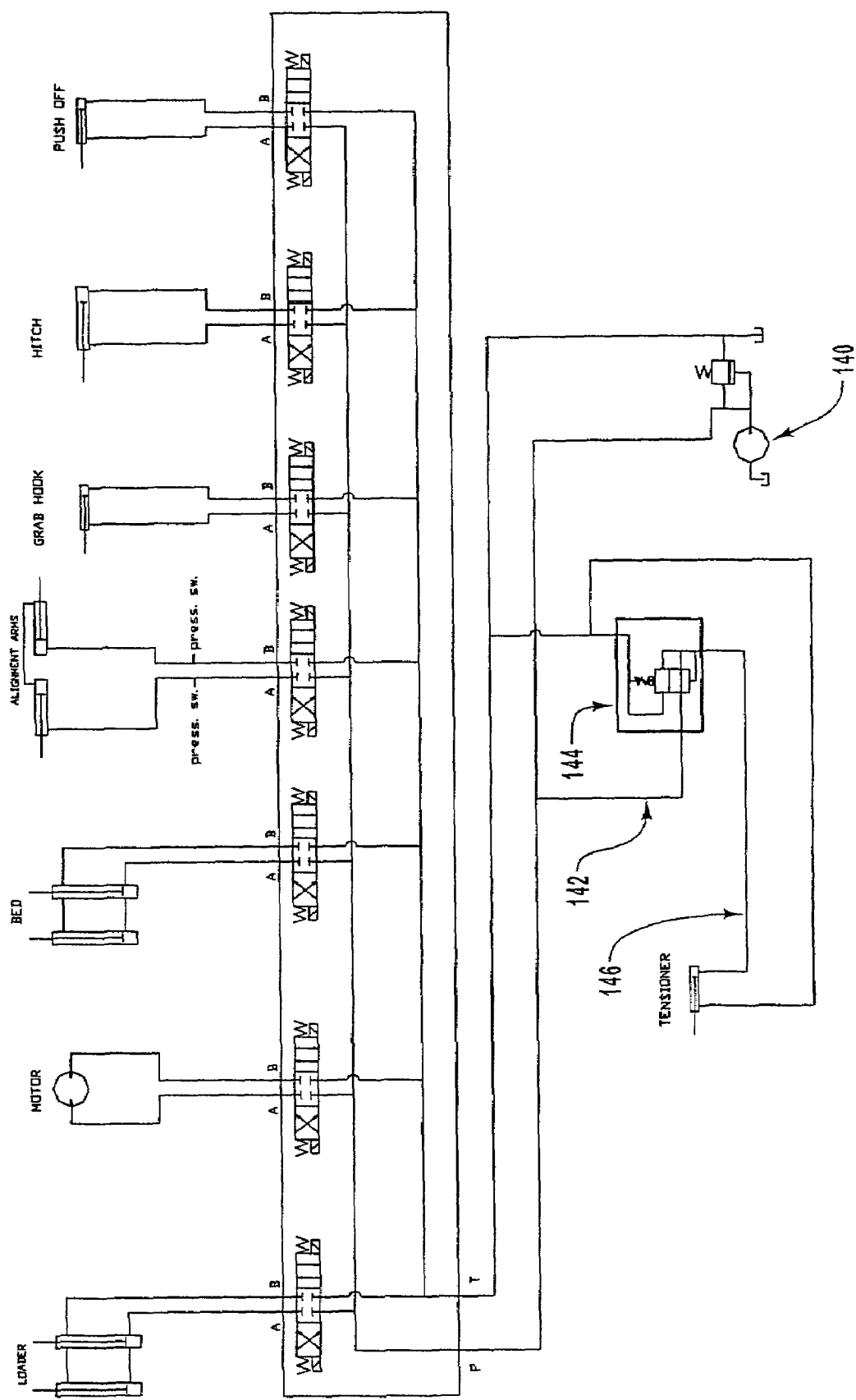
FIG. 10 illustrates a representative schematic of a hydraulic system that may be used in association with the present invention.

A flow control device 102 is electrically controlled by solenoids pushing on flow diverting devices. Device 102 includes seven different flow diverting devices, each activated by two solenoids. Computer device 96 powers an appropriate solenoid to divert hydraulic pressure to an appropriate mechanical device. With reference to FIG. 10, an embodiment of a hydraulic system is provided that may be used in association with embodiments of the present invention. A variable displacement pump 140 creates a constant hydraulic pressure in line 142 and necessary flow to cause mechanical devices to function at appropriate speeds. Valve 144 maintains a specified pressure in line 146, which causes the chain tensioner cylinder to maintain a constant tension on chains 50 (FIG. 5). Because the length of the chains 50 vary as the loading platform 20 is moved up and down, valve 144 allows for fluid to pass through it in order to maintain a constant pressure in line 146.

As has been indicated above, embodiments of the present invention embrace the utilization of a computer device in controlling mechanisms. As such, embodiments of the present invention embrace one or more computer readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer, such as a controller, capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps.

Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system. Moreover, memory utilized by a computer device, such as computer device 96 (FIG. 8) may include one or more computer readable media that may be configured to include or includes thereon data or instructions for manipulating data, and may be accessed by a processing system. Those skilled in the art will appreciate that the invention may be practiced in a variety of computing/controlling environments with many types of computer system configurations.

In one embodiment, a computer program is written and preserved on a computer readable medium to eliminate the crashing of mechanical devices and to simplify the operation of the apparatus. The following is a discussion of a representative manner in which the program may be used in conjunction with the computer device, sensors and switches.

Computer device 96 (FIG. 8) may continually check the position of the sensors and switches to determine the action that is to be implemented on the mechanical devices. A priority code may be utilized in the program to ensure that the mechanical devices do not crash with each other. For example, the computer device will not implement the raising or lowering of the loading platform unless the hitch is offset and the bale accumulation platform is down, or if the bale accumulation platform is in the mid position, unless the loading platform is up.

Switches on handheld control 92 may operate in the following manner as determined by the program. Engaging the loader up switch causes the alignment arms to close or engage the sides of a bale if a bale is between the arms. Once the pressure driving the closing of the alignment arms is high enough, a sensor closes to indicate that a sufficient amount of force is applied to the bale to cause the bale to remain between the alignment arms if the loading platform is raised. The closing of the sensor signals the computer to engage grab hooks if a sensor is closed, indicating that a bale is against the loading platform and positioned between the alignment arms, and to raise the loading platform at a slow rate. In one embodiment, the loading platform will raise slowly for approximately 1.5 seconds and then increase speed, allowing the operator to control the amount of rise of the loading platform by releasing the loader up switch and letting it return to automatic, thus stopping the action To of the loading platform. If the loader up switch is held for more then 1.6 seconds, the operator may release the switch to the auto position and the computer will continue to raise the loading platform to its full up position. The operator may stop the loading platform from raising automatically by engaging the loader reset switch momentarily.

If the operator again engages the loader up switch after having stopped the action of the loading platform, the computer will check with a corresponding sensor before raising the loading platform. When the loading platform reaches the full up position, which is indicated to the computer by the closing of a sensor, the computer will automatically stop the loading platform from raising, position the power slider mechanism so that the push bar is in front of the bales on the loading platform, and release the grab hooks. The push bar will stall in front of the bales on the loading platform since the grab hooks are not released until a position sensor indicates to the computer that the power slider mechanism is stalled. The operator may then engage the loader reset switch to cause the alignment arms to open.

After the alignment arms open, a sensor closes because of increased pressure to the alignment arm cylinders, signaling the computer to start the power slider mechanism to drive the row of bales back. After the row is pushed back, the position switch indicates to the computer that the motion of the power slider mechanism has stalled. The computer then sends a signal to the flow control device to return the power slider mechanism to its original or home position. The computer knows where the home position is for the slider mechanism because of the position switch and from when the power slider mechanism stalled initially in front of the bales. The computer sets the initial stall position count at 30 cycles. As the row of bales are pushed back, the position switch counts up to the next stall. The computer, upon return of the power slider mechanism, monitors the position switch and does not stop the action of the power slider mechanism until the count is down to zero, thus returning the power slider mechanism to a position under the loading platform. The position of the power slider mechanism under the loading platform is variable between a mechanical stop and a position that maintains the power slider mechanism under the loading platform as the loading platform is lowered. The computer does not allow the power slider mechanism to crash into the mechanical stop. The count is determined by the relative motion caused by an opened and closed cycle of the position switch. The higher the initial number on the first stall position, the further the power slider mechanism is returned and vise versa.

The operator may continue to toggle the loader switch until a full load is completed. If a mechanism is not actuated properly by the computer the operator may return to the manual mode and manually force the necessary motions to occur, unless mechanisms would otherwise crash. The computer does not return the power slider mechanism after the initial stall unless the power slider mechanism has moved past the last row position to indicate that the row of bales have been appropriately moved. Therefore, if the power slider mechanism does not have the force required to move the bales back, the operator may manually initiate the raising of the bale accumulation platform to lessening the force required to move the row of bales.

The last row of bales loaded will not move the required distance for the computer to return the power slider mechanism. Thus, when an operator engages the hitch inline switch, the computer receives a signal to return the power slider mechanism to the home position. The operator only needs to hold the hitch inline switch until the hitch moves past the hitch offset sensor. After that, the operator may release the hitch switch and the computer automatically returns the hitch to the inline position and returns the power slider mechanism to the home position.

At the stacking location, the switches for the hitch, bale accumulation platform and push-off all function directly as indicated herein. In one embodiment, the off position stops the motion of the indicated mechanism with the exception that activation of the bed reset switch for one second when the push-off is out and the bale accumulation platform is in the mid to up position causes the computer to automatically return the push-off to the in position, lower the bale accumulation platform to the mid position, raise the loading platform to the up position, continue to lower the bale accumulation platform to the down position and then return the hitch to the inline position.

Thus, as discussed herein, the embodiments of the present invention embrace systems, methods and apparatuses for loading, stacking, and/or handling large bales of hay. Those skilled in the art will appreciate that embodiments of the present invention embrace a variety of system and apparatus configuration to perform the methods disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A bale handling apparatus comprising:
   a frame;
   an accumulating platform for supporting a plurality of bales, wherein the accumulating platform is pivotably coupled to the frame to selectively move between a horizontal bale accumulating position and a vertical bale unloading position; and
   a loading mechanism pivotably coupled to the accumulating platform, wherein the loading mechanism is configured to receive a bale,
   said loading mechanism including a loading platform pivotably coupled with the accumulating platform for selective movement between a generally upright position for picking up bales from the ground and a raised position generally in line with the accumulating platform for supporting picked up bales above the ground,
   said loading mechanism further including a sliding mechanism operable on both the loading platform and the accumulating platform for moving bales from the loading platform onto the accumulating platform when the loading platform is in its raised position.

2. A bale handling apparatus as recited in claim 1, wherein the sliding mechanism comprises:

a chain;
a sprocket configured to receive the chain, wherein the sprocket is pivotably coupled to the accumulating platform; and
a push bar coupled to the chain, wherein the push bar is configured to contact the bale.

3. A bale handling apparatus as recited in claim 1, wherein the loading mechanism comprises one or more arms pivotably coupled to the loading platform.

4. A bale handling apparatus as recited in claim 1, wherein the frame includes a tandem axle.

5. A bale handling apparatus as recited in claim 1, further comprising an unloading mechanism coupled to the frame.

6. A bale handling apparatus as recited in claim 5, wherein the unloading mechanism comprises a push-off mechanism.

7. A bale handling apparatus as recited in claim 6, wherein the push-off mechanism is powered by a hydraulic cylinder and comprises a shaft that is configured to slide in relation with a guide.

8. A bale handling apparatus as recited in claim 1, further comprising a control system coupled to the frame.

9. A bale handling apparatus as recited in claim 8, wherein the control system includes at least one of:
   (i) a computer device;
   (ii) a sensor; and
   (iii) a switch.

10. A bale handling apparatus as recited in claim 9, wherein the computer device is a controller.

11. A bale handling apparatus comprising:
a frame;
a platform for supporting a plurality of bales, wherein the platform is pivotably coupled to the frame to selectively move between a horizontal position and a vertical position; and
a loading mechanism pivotably coupled to the platform, wherein the loading mechanism is configured to receive a bale,
further comprising a sliding mechanism that is configured to move a bale from the loading mechanism to the platform, wherein the sliding mechanism is coupled to the platform and to the loading mechanism,
wherein the sliding mechanism comprises:
a chain;
a sprocket configured to receive the chain, wherein the sprocket is pivotably coupled to the platform; and
a push bar coupled to the chain, wherein the push bar is configured to contact the bale,
wherein the push bar comprises at least one of:
   (i) a toothed edge that is configured to poke into a surface of the bale; and
   (ii) a lip that is configured to maintain the contact with the bale.

12. A bale handling apparatus comprising:
a frame;
a platform for supporting a plurality of bales, wherein the platform is pivotably coupled to the frame to selectively move between a horizontal position and a vertical position; and
a loading mechanism pivotably coupled to the platform, wherein the loading mechanism is configured to receive a bale,
further comprising a sliding mechanism that is configured to move a bale from the loading mechanism to the platform, wherein the sliding mechanism is coupled to the platform and to the loading mechanism,
wherein the sliding mechanism comprises:
a chain;
a sprocket configured to receive the chain, wherein the sprocket is pivotably coupled to the platform; and
a push bar coupled to the chain, wherein the push bar is configured to contact the bale,
further comprising a chain tensioner that is configured to maintain the chain taut.

13. A method for handling bales, the method comprising the steps of:
receiving a bale at a loading mechanism;
selectively pivoting the loading platform from a vertical position to a horizontal position, wherein the pivoting is performed at a coupling of the loading platform with a horizontal accumulating platform that is configured to support the bale; and
engaging a sliding mechanism on the loading platform and the accumulating platform when the loading platform is in its horizontal position to move the bale from the loading platform onto the accumulating platform to locate the bale on the accumulating platform.

14. The method as recited in claim 13,
further comprising carrying out said receiving, selectively pivoting, and engaging steps with more than one bale at a time.

15. The method as recited in claim 13, wherein the step of engaging the sliding mechanism is performed by a computer device.

16. The method as recited in claim 13, further comprising the step of selectively pivoting the accumulating platform from a horizontal platform position to a vertical platform position.

17. The method as recited in claim 16, further comprising the step of engaging a pushing mechanism to push the bale away from the accumulating platform while the accumulating platform is in the vertical platform position.

18. A computer program product for implementing within a computer system a method for handling bales, the computer program product comprising:
a computer readable medium for providing computer program code means utilized to implement the method, wherein the computer program code means is comprised of executable code for implementing at least one of the steps of:
selectively implementing a pivoting of a loading platform of a loading mechanism from a vertical position to a horizontal position, wherein the loading platform has received a bale, and wherein the pivoting is performed at a coupling of the loading platform with a horizontal accumulating platform that is configured to support the bale;
selectively engaging a sliding mechanism to move the bale from the loading platform onto the accumulating platform to locate the bale on the accumulating platform;
selectively pivoting the accumulating platform from a horizontal platform position to a vertical platform position; and
engaging a pushing mechanism to push the bale away from the accumulating platform while the accumulating platform is in the vertical platform position to unload the bale.

* * * * *